(12) United States Patent
Kazawa et al.

(10) Patent No.: US 7,711,268 B2
(45) Date of Patent: May 4, 2010

(54) PASSIVE OPTICAL NETWORK SYSTEM AND RANGING SYSTEM THEREOF

(75) Inventors: Tohru Kazawa, Kokubunji (JP); Masaki Ohira, Yokohama (JP); Yusuke Yajima, Fujisawa (JP); Norihiro Sakamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/254,590

(22) Filed: Oct. 20, 2008

(65) Prior Publication Data
US 2009/0052897 A1 Feb. 26, 2009

Related U.S. Application Data

(63) Continuation of application No. 11/729,974, filed on Mar. 30, 2007, now Pat. No. 7,489,869.

(30) Foreign Application Priority Data
Oct. 13, 2006 (JP) .............................. 2006-279446

(51) Int. Cl.
*H04J 14/00* (2006.01)
(52) U.S. Cl. .............................. 398/71; 398/66; 398/67; 398/72
(58) Field of Classification Search .................... 398/43, 398/66–68, 70–73, 75–77
See application file for complete search history.

(56) References Cited

U.S. PATENT DOCUMENTS

| | | | | |
|---|---|---|---|---|
| 5,930,018 | A * | 7/1999 | Effenberger | 398/161 |
| 2005/0163149 | A1* | 7/2005 | Unitt et al. | 370/442 |
| 2007/0237189 | A1 | 10/2007 | Miguel et al. | |
| 2007/0237520 | A1 | 10/2007 | DeLew et al. | |

FOREIGN PATENT DOCUMENTS

| | | |
|---|---|---|
| JP | 2001-24598 | 1/2001 |
| JP | 2004-64494 | 2/2004 |

OTHER PUBLICATIONS

"Gigabit-capable Passive Optical Networks (G-PON): Transmission convergence layer specification"International Telecommunication Union, Feb. 2004, Chapters 8 and 9, G.984.3.
"Gigabit-capable Passive Optical Networks (GPON): General characteristics", International Telecommunication Union, Mar. 2003, Chapter 10, G.984.1.

* cited by examiner

*Primary Examiner*—Quan-Zhen Wang
(74) *Attorney, Agent, or Firm*—McDermott Will & Emery LLP

(57) ABSTRACT

A station-side communication device connected to subscriber-side communication devices via an optical combining device; sending, to the subscriber-side communication devices, a distance measurement request signal; computing transmission delay times of optical signals from the individual subscriber-side communication devices by receiving distance measurement signals, and including: a threshold control part identifying the level of distance measurement signals; a signal detection part detecting breaks in the distance measurement signals from the threshold control part; a transmission granting part determining the timing at which transmission of optical signals is granted, and a reset timing generation part that, there is notification of detection of a break in the distance measurement signal from the signal detection part while it is being notified that distance measurement is carried out to and from the subscriber-side communication devices from the transmission granting part, sends a reset signal indicating that the voltage level is reset to the threshold control part.

7 Claims, 14 Drawing Sheets

"XX km" INDICATES THE FIBER LENGTH BETWEEN OLT AND ONU

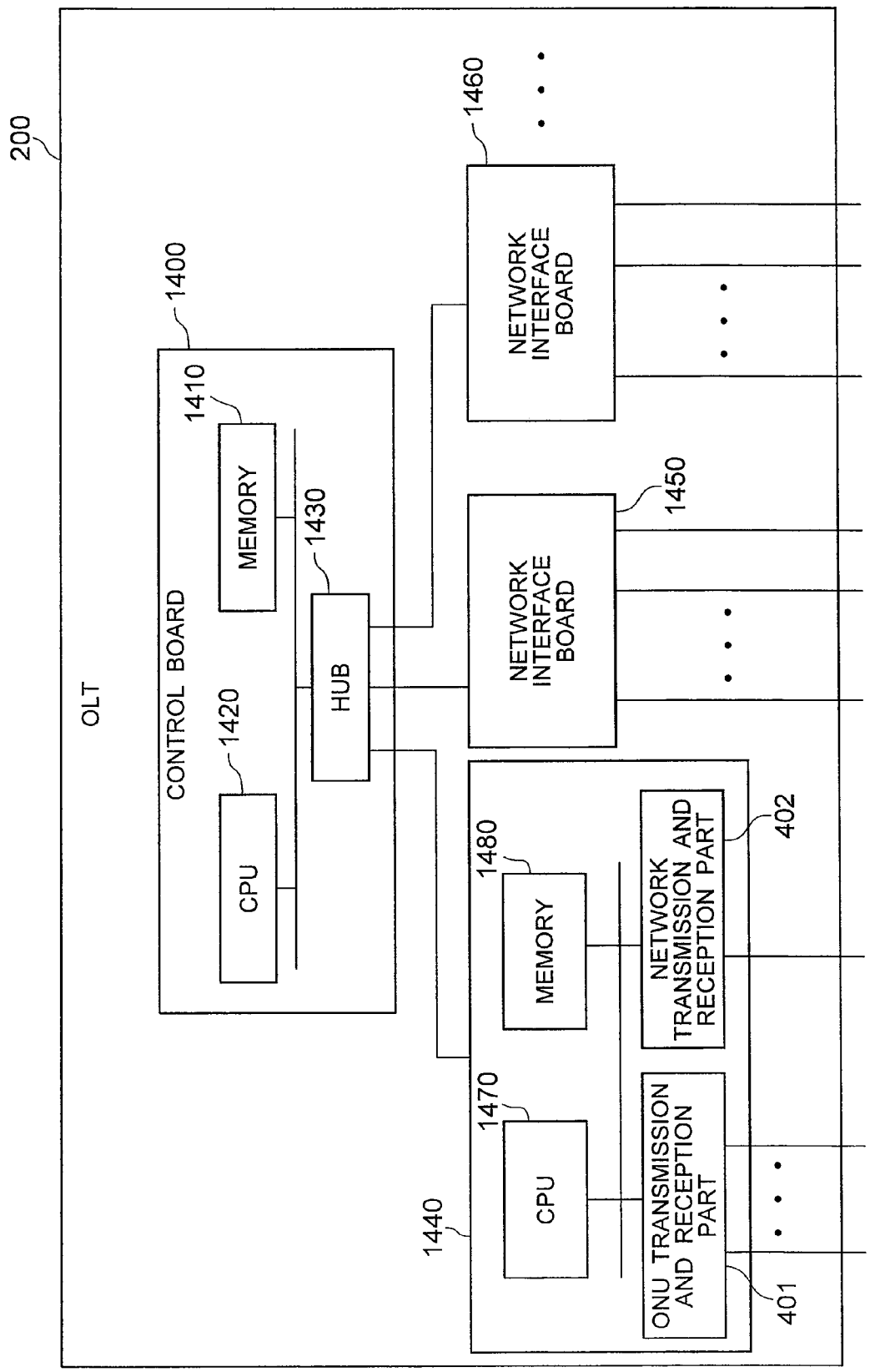

PASSIVE OPTICAL NETWORK SYSTEM AND RANGING SYSTEM THEREOF

INCORPORATION BY REFERENCE

The present application is a Continuation of U.S. application Ser. No. 11/729,974, filed Mar. 30, 2007, now, U.S. Pat. No. 7,489,869, and claims priority from Japanese application JP2006-279446 filed on Oct. 13, 2006, the entire contents of each of which are hereby incorporated by reference into this application.

BACKGROUND OF THE INVENTION

The present application pertains to a PON (Passive Optical Network) system in which a plurality of subscriber connection devices share an optical transmission line.

As an optical access system, there is known the PON which makes a 1-to-n connection (n being an integer equal to or greater than 2) between an OLT (Optical Line Terminal) arranged on the station side and an ONU (Optical Network Unit) arranged on the subscriber side, by means of a device passively carrying out combining of optical signals, such as an optical splitter. A plurality of ONUs are connected to the terminals (e.g. PCs or the like) of the respective subscribers, the electrical signals from a terminal being converted into optical signals and transmitted toward the OLT. The optical splitter having received optical signals from the plurality of ONUs optically multiplexes (time division) the same optical signals. Inversely, an optical signal from the OLT is split, by means of the optical splitter, into a plurality of optical signals and transmitted toward a plurality of ONUs, each ONU selectively receiving and processing signals, from among the transmitted destined for it.

As mentioned above, an uplink signal transmitted from a plurality of ONUs toward an OLT is time division multiplexed by means of an optical splitter. The OLT determines/notifies the transmission timing of the optical signals with respect to the respective ONUs so that the optical signals from the plurality of ONUs do not collide, each ONU transmitting sequentially the optical signals at the notified timing. As specified in Ch. 8 and Ch. 9 of ITU-T Recommendation G.984.1, since the optical fiber length is e.g. set arbitrarily to one range from among the ranges 0-20 km, 20-40 km, and 40-60 km for each ONU, the distances between the OLT and the ONUs, i.e. the optical fiber lengths, are not necessarily equal, also leading to a difference in the transmission delay times of the optical signals transmitted from each ONU toward the OLT. Consequently, there is a need for the OLT to determine the transmission timing of the optical signals by taking into account the optical signal transmission delay times arising from the difference in the distance of each ONU.

In order to implement this, the OLT uses so-called ranging which is described in Ch. 10 of ITU-T Recommendation G.984.3, and by means of this, the OLT adjusts the transmission timing of the respective ONUs as if each ONU had been installed at equal distances, and the optical signals from a plurality of ONUs are made not to mutually interfere. In other words, the OLT assumes that all the ONUs are separated by just the identically same distance, determines/notifies the timing at which each ONU transmits an optical signal, and the OLT further notifies each ONU of the optical signal delay time arising from the difference between the concerned assumed distance and the distance at which each ONU is actually installed, and each ONU transmits an optical signal at a timing delayed, from the transmission timing notified from the OLT, by just the notified delay time.

In ranging, it is necessary for the OLT to transmit a signal for measuring the distance with respect to the ONU. When the ONU returns the distance measurement frame, the OLT receives the same signal, measures the time from the request for transmission of the signal for distance measurement until the reception of the signal for distance measurement, i.e. the roundtrip delay time, and finds out how much the ONU is separated from the OLT. Next, the OLT, in order to make all the ONUs appear to be at an equal distance, sends instructions for each ONU to delay transmission by just a time called the equalization delay (EqD). E.g., in order to make all the ONUs have a roundtrip delay time of 20 km, it indicates to the ONU an equalization delay equal to ("20 km roundtrip delay time")–("measured roundtrip delay time"). The ONU is provided with a circuit that transmits data with a fixed delay of just the indicated equalization delay, and by means of the aforementioned instruction, and uplink data transmission is carried out so that all the ONUs have a 20 km roundtrip delay time.

Also, in the Ethernet™ PON system defined in Ch. 64 of the IEEE 802.3 Standard, the aforementioned distance measurement is carried out notwithstanding the fact that no equalization delay instruction is present. Instead, after the distance measurement, in case the OLT sends a grant to the ONU, the Start value of the grant is compensated on the basis of the measured roundtrip delay time.

SUMMARY OF THE INVENTION

In ranging, the signal for distance measurement sent by the OLT is received by a plurality of ONUs, and each ONU having received this signal transmits to the OLT a response signal with respect to the same signal. Since the timing at which the response signals from each ONU at this point in time arrive at the OLT is not adjusted, there is the possibility that the OLT receives a number of response signals within a short time period. In order to prevent this, there is provided in the OLT, for a certain fixed time interval after a signal for distance measurement has been transmitted to the ONU, a non-signal domain (ranging window) devised not to receive any response signal other than the response signal first received.

In this way, the OLT transmits a signal for distance measurement, since there is computed for each ONU an equalization delay time for the same ONU, it is not possible, within the ranging window of one ONU, for other ONUs to transmit an optical signal with respect to the OLT. For this reason, in order to carry out ranging of an ONU located within the range of e.g. a fiber length of 0-60 km, a non-signal domain (ranging window) with a length of 600 μs corresponding to a 60 km roundtrip delay time is necessary. As mentioned above, since the distance measurement is carried out with respect to the ONUs within one ranging window, for e.g. the distance measurement of e.g. 128 ONUs, there is needed an extended non-signal domain of 76.8 ms, lengthened 128 times. Further, when the stability of the system is taken into account, it is desirable for the distance measurement to take an average over a plurality of times, and if the ranging is e.g. carried out using an average of four times the distance measurement result, the domains which cannot be utilized by the user are further lengthened by a factor 4, there being necessary an extended non-signal domain of 307.2 ms.

In order to suppress the loss of signal domain due to this ranging, it is acceptable to broaden the interval during which ranging is implemented and to make the loss uplink domain sufficiently small. E.g. in the aforementioned example, if the ranging interval is chosen to be 30 seconds, the portion occupied by the 307.2 ms extended non-signal domain becomes on the order of 1%, something which can be thoroughly neglected. However, in this case, there occurs the new problem that 30 seconds are required to activate all the ONUs at once. If the importance of communications service is taken into consideration, it is desirable, in order to suppress to the utmost the service interruption time resulting from a temporary failure, for the time to activate all the ONUs at once have a sufficiently small value, e.g. 1 second.

The present invention has for an object to provide an OLT, ONU, and PON system making possible the activation of one hundred or more ONUs while making efficient use of the band, and in a short time.

In order to combine a low band loss and a short activation time, it is acceptable to enable distance measurements of a plurality of ONUs inside one ranging window.

The aforementioned task is implemented by means of a method wherein the OLT is provided with a plurality of distance measurement circuits, receives a plurality of distance measurement signals transmitted from the plurality of ONUs inside one interval of the ranging window, validates a delimiter detection circuit directly after receiving a distance measurement signal, and carries out a reset of an automatic threshold circuit.

Also, as another means for attaining the task, the OLT periodically generates, regardless of the presence of an uplink ranging response in the ranging window, plurality of ATC reset pulses, and when the ONU receives a ranging request, it transmits a plurality of ranging responses at an interval which is different from an integer multiple of the aforementioned period. By transmitting a plurality of ranging responses, at least one signal is able to bring the distance measurement to success without colliding with the ATC reset pulse.

According to the present invention, it is possible to provide an optical access system which, while making effective use of the band, enables the activation of one hundred ONUs or more in a short time, within 1 second.

Other objects, features and advantages of the invention will become apparent from the following description of the embodiments of the invention taken in conjunction with the accompanying drawings.

BRIEF DESCRIPTION OF THE DRAWINGS

FIG. 14 is a diagram showing an embodiment of the hardware configuration of an OLT.

DESCRIPTION OF THE EMBODIMENTS

Below, embodiments of the present invention will be explained.

First Embodiment

Figure 1:
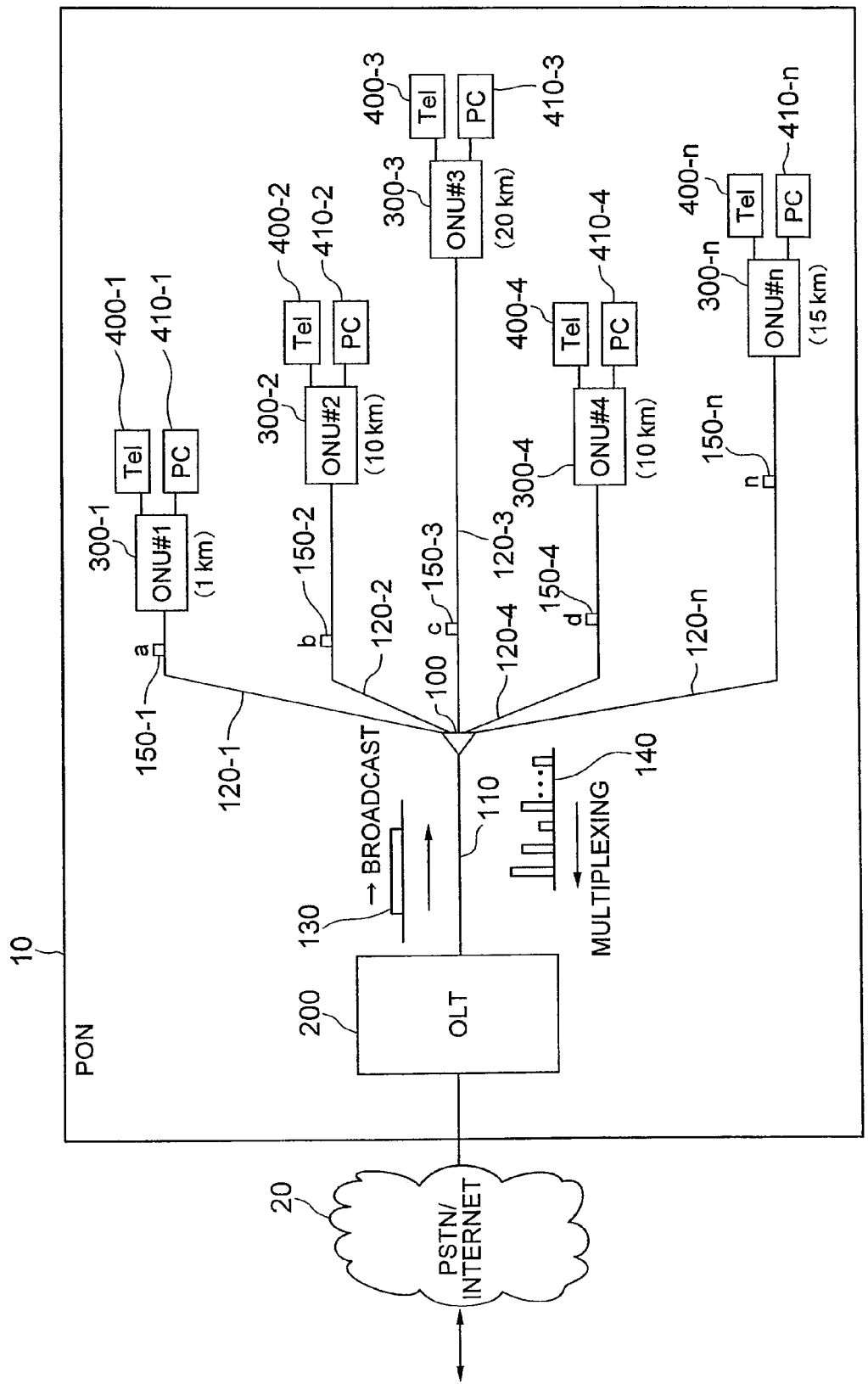
FIG. 1 is a diagram showing an embodiment of a PON network configuration according to the present invention.

FIG. 1 shows the configuration of an optical network in which the present invention is applied.

PON 10 is composed of an optical splitter 100, an OLT 200 being a device on the station side installed in an office building of a telecommunications operator or the like, a trunk fiber 110 connecting OLT 200 and the optical splitter, a plurality of ONUs 300 being subscriber side devices installed inside the respective subscriber residences or in the vicinity thereof, and a plurality of branch fibers 120 respectively connecting optical splitter 100 and a plurality of ONUs 300. OLT 200 can be connected, via trunk fiber 110, optical splitter 100, and branch fibers 120, to e.g. 32 ONUs 300. Also, user terminals such as telephones 400 and Personal Computers 410 are respectively connected to the plurality of ONUs 300. PON 10 is connected via OLT 200 to a PSTN (Public Switched Telephone Network) or the Internet 20 and transmits and receives data to/from external networks.

In FIG. 1, five ONUs are illustrated which respectively have differing fiber lengths from OLT 200. In FIG. 1, ONU 300-1 has a fiber length from OLT 200 of 1 km, ONU 300-2 has a fiber length from OLT 200 of 10 km, ONU 300-3 has a fiber length from OLT 200 of 20 km, ONU 300-4 has a fiber length from OLT 200 of 10 km, and ONU 300-$n$ has a fiber length from OLT 200 of 15 km. In a signal 130 transmitted in the downlink direction from OLT 200 to ONU 300, the respective signals destined for ONU 300 are time division multiplexed. Each ONU 300 receives signal 130, determines whether or not the signal is destined for it, and moreover, in case the signal was one destined for it, delivers the signal to a telephone 400 or a Personal Computer 410, based on the recipient of the signal.

Also, in the uplink direction from ONU 300 to OLT 200, signal 150-1 transmitted from ONU 300-1, signal 150-2 transmitted from ONU 300-2, signal 150-3 transmitted from ONU 300-3, signal 150-4 transmitted from ONU 300-4, and signal 150-$n$ transmitted from ONU 300-$n$, become a signal 140 after having passed optical splitter 100 and being time division multiplexed, and reach OLT 200. Since OLT 200 understands in advance from which ONU a signal was received at which timing, it carries out processing by identifying the signal from each ONU in response to the received timing.

Figure 2:
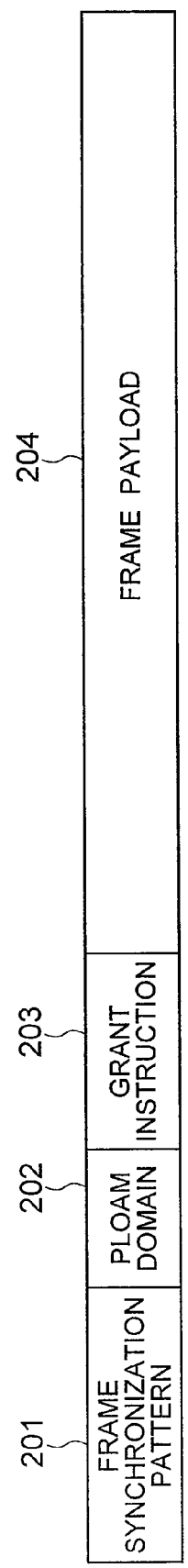
FIG. 2 is a diagram showing an embodiment of a downlink PON signal frame.

In FIG. 2, there is shown an example of a downlink PON signal frame transmitted from OLT 200 to each ONU 300. The downlink frame is composed of a frame synchronization pattern 201, a PLOAM domain 202, a grant instruction domain 203, and a frame payload 204. Grant instruction domain 203 corresponds to a so-called "US Bandwidth MAP" shown in Section 8.1.3.6 of the same Recommendation, and the OLT specifies the uplink transmission grant timing of each ONU, using this domain. The "US Bandwidth MAP" domain comprises a "Start" value designating the beginning of the transmission grant and an "End" value designating its completion, with a designation of the respective byte units being carried out. This value, having the meaning of granting transmission, is also called a grant value.

Further, in the individual ONUs, a plurality of band allocation units called T-CONT (Trail CONTainer) can be allocated, the designations of uplink and downlink transmission grant timing being carried out for each T-CONT. In grant instruction domain 203, there are stored, for each T-CONT, a "Start" value expressing the timing at which the optical signal transmission starts and an "End" value expressing the timing at which the optical signal transmission ends. T-CONT is a band allocation unit in DBA and, in case e.g. the ONU has a plurality of buffers, T-CONT IDs which are identification information items concerning T-CONT, are given to the respective buffers, it also being possible to control for each buffer from the OLT.

The "ranging time" message in FIG. 13 which will be subsequently described is stored in PLOAM domain 202 and a "ranging request" signal 310-1 and a "grant, request report" signal 320 including information as to the timing at which transmission of optical signals start in each ONU are stored in "Grant" instruction domain 203. In frame payload 204, user signals and the like from OLT 200 toward ONU 300 are stored. Details are described in ITU-T Recommendation G.984.3.

Figure 3:
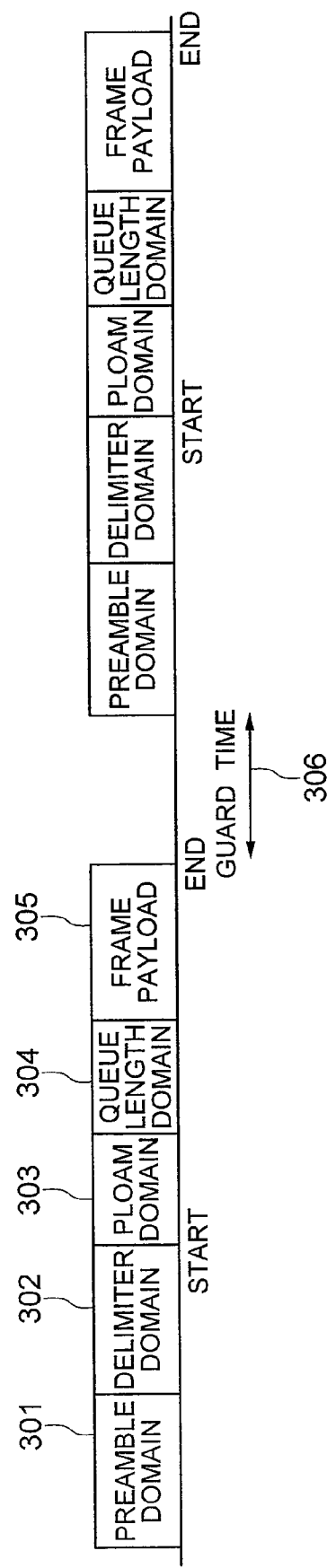
FIG. 3 is a diagram showing an embodiment of an uplink PON signal frame.

In FIG. 3, there is shown an example of an uplink PON frame transmitted from an ONU to the OLT. Uplink signal 150-1 coming from ONU 300-1 is composed of a preamble domain 301, a delimiter domain 302, a PLOAM domain 303, a queue length domain 304, and a frame payload 305. The aforementioned "Start" value indicates the start position of PLOAM domain 303 and "End" value 313 indicates the end position of frame payload 305. Immediately before each uplink signal, there is set a guard time for preventing a collision with the previous burst signal. The difference between the aforementioned "End" value and the subsequent "Start" value corresponds to the guard time which is a domain of no uplink signal. In other words, the time from the end position of frame payload 305 of the uplink signal until preamble domain 301 of the subsequent uplink signal corresponds to the guard time. Further, in the present embodiment, by detecting the signal of the delimiter domain, it is identified that the data from the delimiter domain onward are new data. In other words, the delimiter domain is used as information for identifying breaks between signals.

Figure 4:
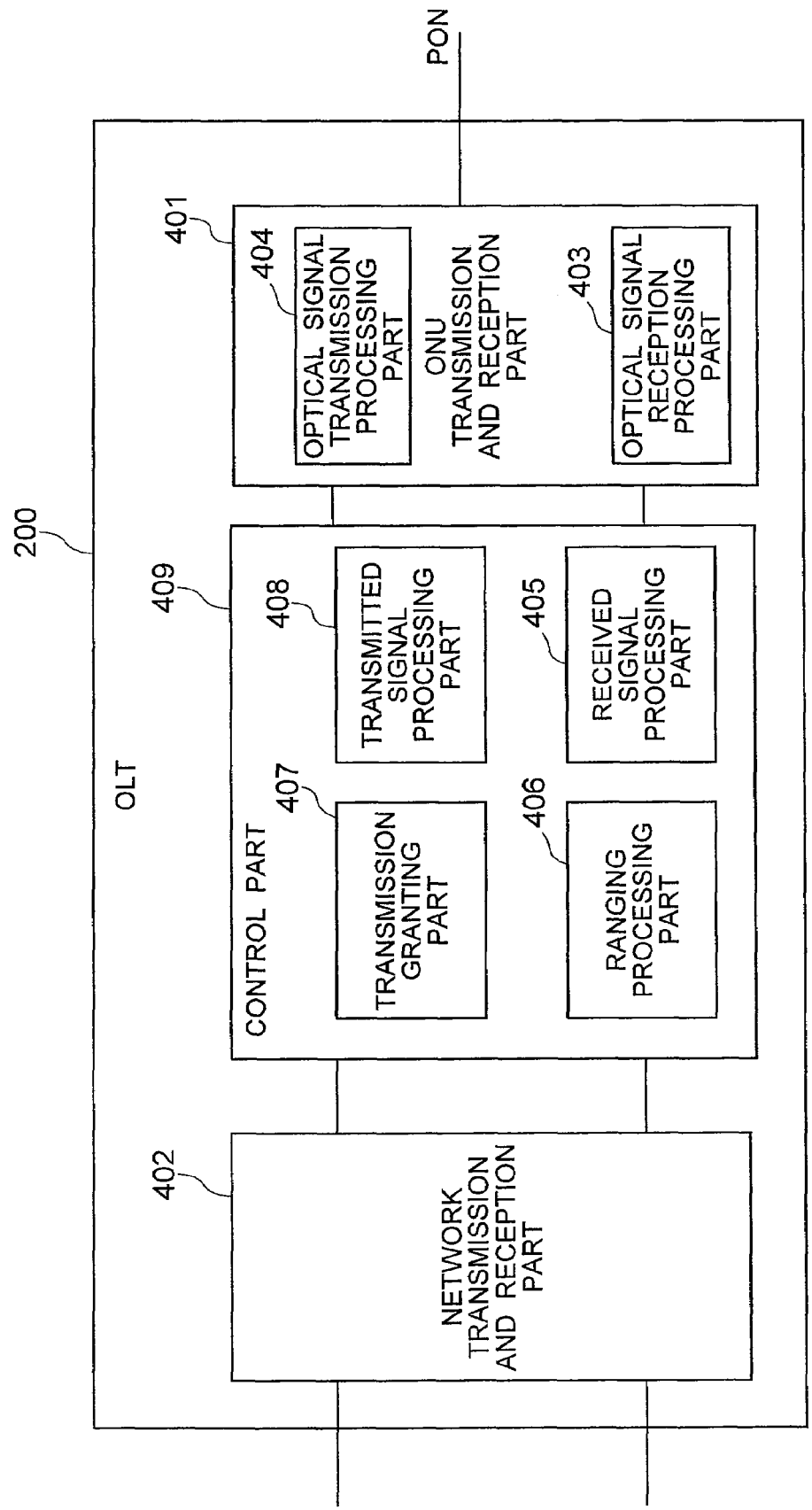
FIG. 4 is a diagram showing an embodiment of an OLT functional block.

In FIG. 4, a configuration example of an OLT 200 according to the present invention is shown. An ONU transmission and reception part 401 is a part transmitting and receiving optical signals to and from ONU 300 which carries out processing such as converting the optical signal received from the ONU into an electrical signal by means of a optical signal reception processing part 403, transmitting as optical signals the electrical signal inside the device by means of an optical signal transmission processing part 404, and transmitting the signal to the ONU. Network transmission and reception part 402 carries out transmission and reception of PSTN or Internet 20 signals to and from higher-level networks. A control part 409 carries processing and the like according to the PON Protocol with respect to input and output signals. A received signal processing part 405 carries out processing such as cutting and dividing electrical signals received from optical signal reception processing part 403 into PON frames. A ranging processing part 406 carries out ranging processing to be subsequently described. Transmission granting part 407 sets the "Start" value and the "End" value of each ONU, from the values for the communication bands allocated to each ONU by means of DBA processing, and notifies each ONU of these values. A transmitted signal processing part 408 generates PON frames transmitted to each ONU.

In FIG. 14, there is shown an example of a hardware configuration of OLT 200. OLT 200 has a control board 1400 managing the operation of the whole device and a plurality of network interface boards 1440, 1450, and 1460 being respectively connected to the network and carrying out signal transmission and reception. Control board 1400 has a memory 1410 and a CPU 1420 and controls each network interface board through a hub 1430. Each network interface board has an ONU transmission and reception part 401 and a network transmission and reception part 402 as well as a CPU 1470, carrying out processing required for the transmission and reception of signals occurring between the ONU and the Internet or a PSTN, and a memory 1480. A wide variety of processing types occurring in the present embodiment function e.g. by CPU 1470 executing programs stored in memory 1480. Otherwise, as the need arises, dedicated hardware (LSI and the like) specialized in each type of processing is available, it being acceptable to execute processing by means of this. Further, the configuration of the OLT hardware is not limited hereto, it being acceptable for various devices to carry out the processing in response to an appropriate need.

Figure 13:
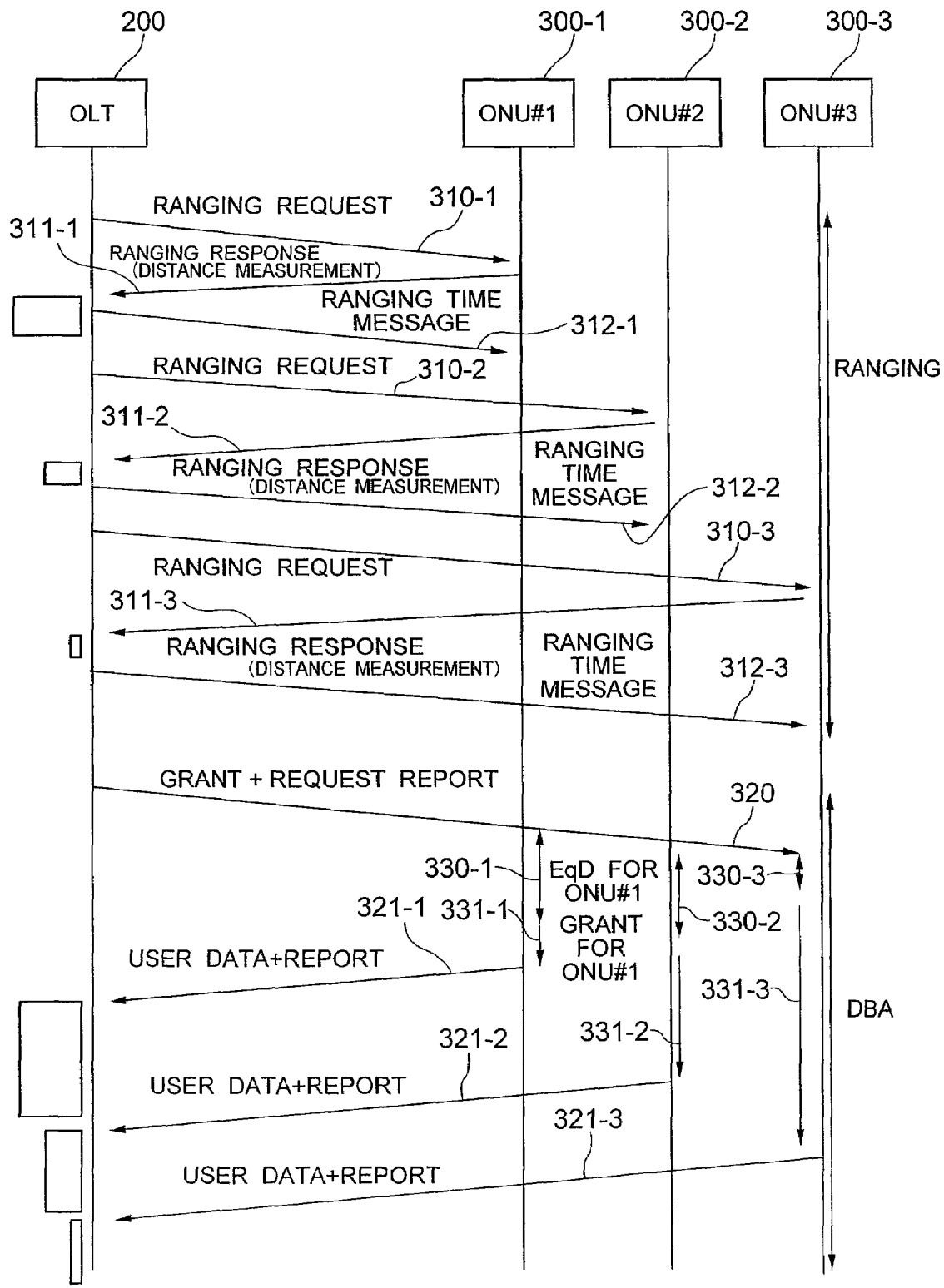
FIG. 13 is a diagram showing an example of ranging operation in a PON.

In FIG. 13, there are shown the ranging signals occurring in the optical access network of the present embodiment. OLT 200 transmits a "ranging request" signal 310-1 toward ONU 300-1. ONU 300-1, after receiving "ranging request" signal 310-1, transmits a "ranging response" signal 311-1 after a determined fixed time. OLT 200 determines, from the difference in the transmission timing of "ranging request" signal 310-1 and the reception timing of "ranging response" signal 311-1, the distance to ONU 300-1. Next, OLT 200 transmits a "ranging time" message 312-1 and sets an equalization delay 330-1 with respect to ONU 300-1. By the functioning of this equalization delay 330-1, regardless of the physical installation position of ONU 300-1, the distance from OLT 200 is regulated as if it were 20 km. Below, the distance measurement of ONU 300-2 and ONU 300-3 is carried out in the same way.

After this, OLT 200 requests, by transmitting "grant and request report" signal 320 with respect to ONU 300-1, ONU 300-2, and ONU 300-3, that the requested transmission volume be notified together with giving an uplink transmission grant. Corresponding to this signal, ONU 300-1 transmits user data and a report 321-1. In the report, the volume of uplink signals waiting for transmission inside ONU 300-1 is displayed with the number of bytes and notified to OLT 200. The transmission of user data and report 321-1 is carried out after receiving the user data and report 321-1 with a timing delayed, from the instructed timing 331-1 based on the grant, by just equalization delay 330-1. The transmission control of ONU 300-2 and ONU 300-3 is also similar, so by means of this operation, when OLT 200 receives an uplink signal, the user data from ONU 300-1 and report 321-1, the user data from ONU 300-2 and report 321-2, and the user data from ONU 300-3 and report 321-3, are lined up efficiently without mutually colliding or being greatly separated and are received by OLT 200. In this way, on the basis of the respective transmission requests of ONU 300-1, ONU 300-2, and ONU 300-3, Dynamic Bandwidth Allocation (DBA) is implemented by means of changing the volume of uplink transmission requests.

In case a plurality of ONU distance measurements are implemented within one ranging window, in order that the length of the preamble signal for synchronization permitted in the uplink burst signal defined in ITU-T Recommendation G.984.3 does not exceed several bytes, a manipulation applying a reset to the receiver by means of a timing known in advance is indispensable for carrying out the pullback of the identification threshold value of the uplink signal and the clock with a short preamble like this. In practice, in a steady state after ONU activation, since the arrival time of the uplink burst signal is controlled with the OLT instruction, applying a reset to the uplink receiver is simple. However, in the ranging process, since the arrival times of the distance measurement signals differ depending on the distance between the OLT and the ONU, it is not possible to apply a reset to the receiver by means of a timing known in advance. If it is an Etherne™ PON defined in the IEEE 802.3ah standard in which a preamble with a length of several hundred bytes is permitted, signal reception is possible using fast-tracking AGC (Automatic Gain Control) and not using a reset, but in the short preamble defined in Recommendation G.984.3, no method is proposed for carrying out a distance measurement of a burst signal of several bytes within one ranging window. Since this is implemented in the present embodiment, an improvement is added to OLT ranging processing.

Using FIG. 5, an explanation will be given of the details of the functional block related to the ranging processing of the OLT 200 in the present embodiment. An optical signal received from trunk fiber 110 is converted into an electrical signal by an O/E conversion part 501 and there is carried out an identification of a value "0" or a value "1" on the basis of an appropriate threshold value in an ATC (Automatic Threshold Control) unit 503. Subsequently, clock extraction and retiming are carried out, a delimiter detection part 504 detecting delimiter domain 302 shown in FIG. 3 and identifying a break in the uplink signal. PON frame decomposition part 505 decomposes the uplink PON frame explained in FIG. 3 and sends the queue length report stored in queue length domain 304 to a grant generation part 509. Also, a distance measurement part 507 implements the distance measurement occurring in the ranging operation explained in FIG. 13 and computes the equalization delay for each ONU. Grant generation part 509 carries out DBA processing using the queue length report from the PON frame decomposition part, determines the communication band allocated to each ONU, and generates a "Start" value and an "End" value. Moreover, this "Start" value and this "End" value are handed over to a reset timing part 506 and are also used for the reset of ATC 208. A PON frame generation part 510 stores the signal from grand generation part 509, based on the downlink PON frame signal format explained in FIG. 2, in grant instruction domain 203 and transmits it. Also, the equalization delay computed by distance measurement part 507 is also stored in the "Ranging time" message format by PON frame generation part 510 and is transmitted toward each ONU. A driver 511 converts the electrical signal from PON frame generation part 510 from a voltage to a current signal and E/O conversion part 502 converts the current signal into an optical signal and transmits it to trunk fiber 110.

Figure 6:
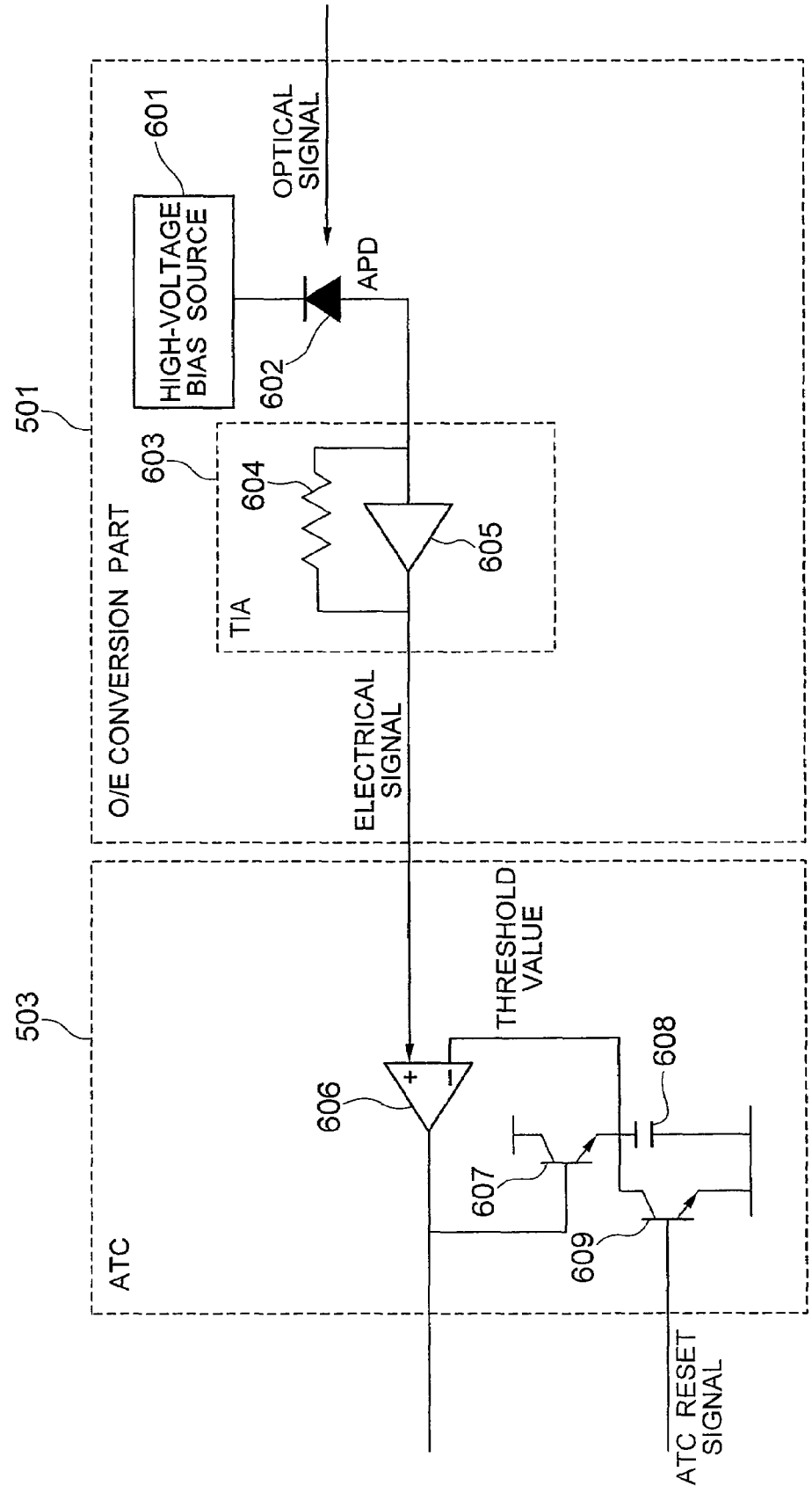
FIG. 6 is a diagram showing an embodiment of an optical signal receiving portion.

FIG. 6 shows a configuration example of the optical signal reception portion of the OLT in the present invention. Inside O/E conversion part 501, an APD (Avalanche Photo Diode) connected to a high-voltage bias source 601 is given a reverse bias at a high voltage and the received optical signal is amplified and converted into a current signal by means of the avalanche effect. The converted current is converted into voltage with a TIA (Trans Impedance Amplifier) 244 composed of a resistance 604 and an amplifier 605. Together with the voltage of the received signal being output in digital form with an A/D converter, in ATC 503, a threshold value is set at half amplitude and a signal identified as having a value "0" or a value "1" is output. The output of an amplifier 606 has a peak detection carried out on it using the diode function from the base to the emitter of a transistor 607, is held in a capacitor 608, and is provided as the threshold value of an amplifier 609. Immediately before the reception of signals from each ONU, a reset signal is provided to transistor 609 and the threshold value held in capacitor 608 is discharged and reset to the "0" level.

Figure 12:
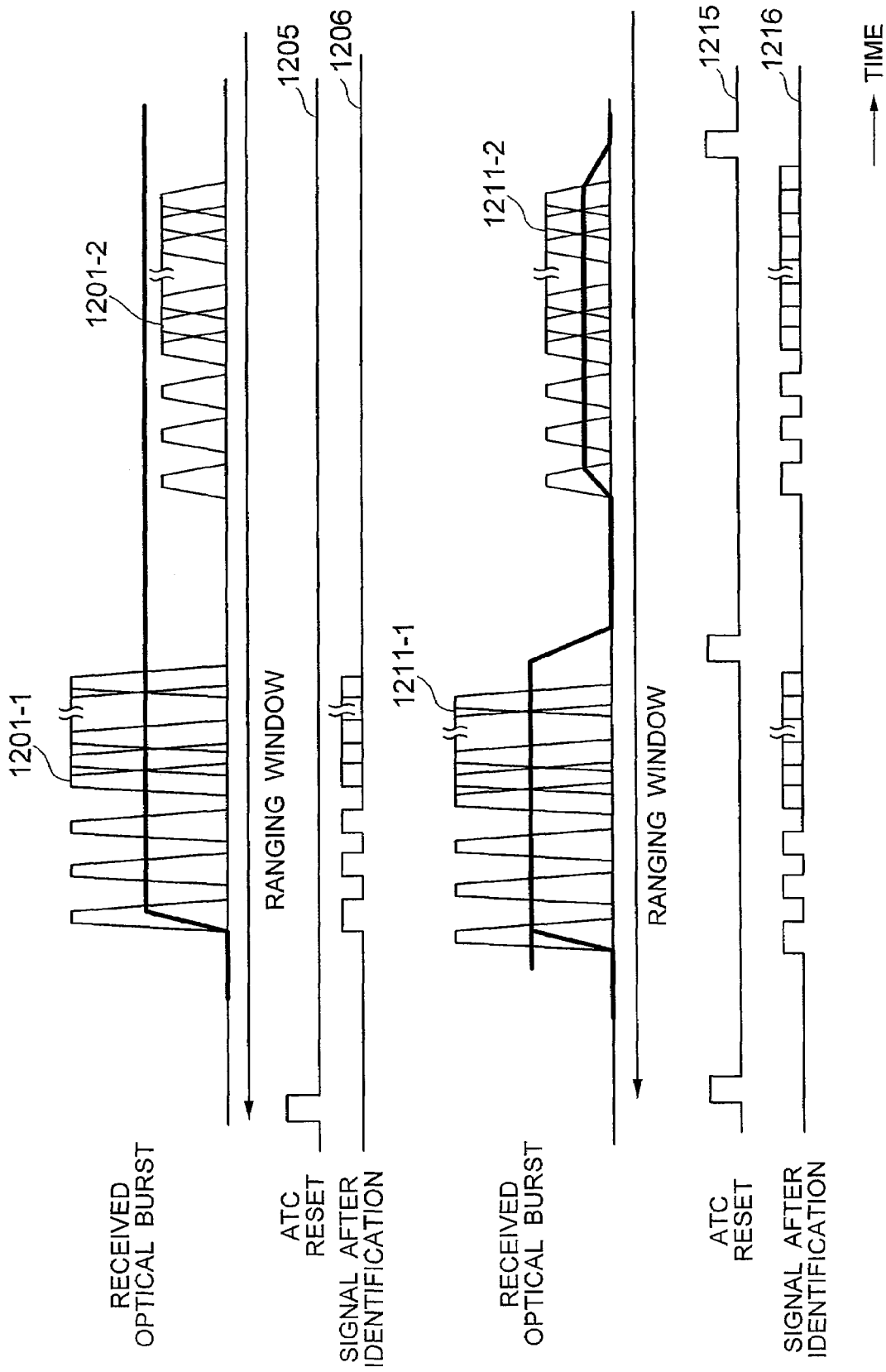
FIG. 12 is a diagram showing the operation of an optical signal receiving portion of an OLT.

The operation of ATC at the time of implementing a distance measurement of a plurality of ONUs within one ranging window is explained by means of FIG. 12. The length of the preamble signal for synchronization permitted in the uplink burst signal defined in ITU-T Recommendation G.984.3 does not exceed several bytes. To carry out the pullback of the uplink signal identification threshold value and the clock pullback with a short preamble such as this, a circuit called ATC (Automatic Threshold Control) shown in FIG. 6 is made necessary. ATC 503 detects the amplitude of the received signal for each input burst at high speed, and by inputting the same threshold value in the capacitor and holding it there, it is stable even for data with consecutive 0's and can receive. The reverse face thereof is that, as shown in FIG. 12, a manipulation of applying a reset to ATC 503 by means of a timing known in advance is indispensable after the burst signal has ended. If there is no reset, the threshold value is left held at the value of the previous signal, so if subsequently a smaller signal is received, the threshold value is too big and correct signal identification is not carried out.

Especially at the time of ranging, since the signal is returned at an earlier time and with larger amplitude the closer the ONU is, it is normal for the subsequently received signal to have an amplitude which gradually gets smaller. Since, in the steady state after ONU activation, the arrival time of the uplink burst signal is controlled by OLT assignment, it is easy to apply a reset to the aforementioned receiver. Since, however, in the ranging process, the arrival times differ for the distance measurement signals depending on the distance between the OLT and the ONU, it is not possible to apply a reset to the receiver by means of a timing known in advance and there is a need for determining a timing at which OLT 200 applies a reset to ATC 503.

Figure 7:
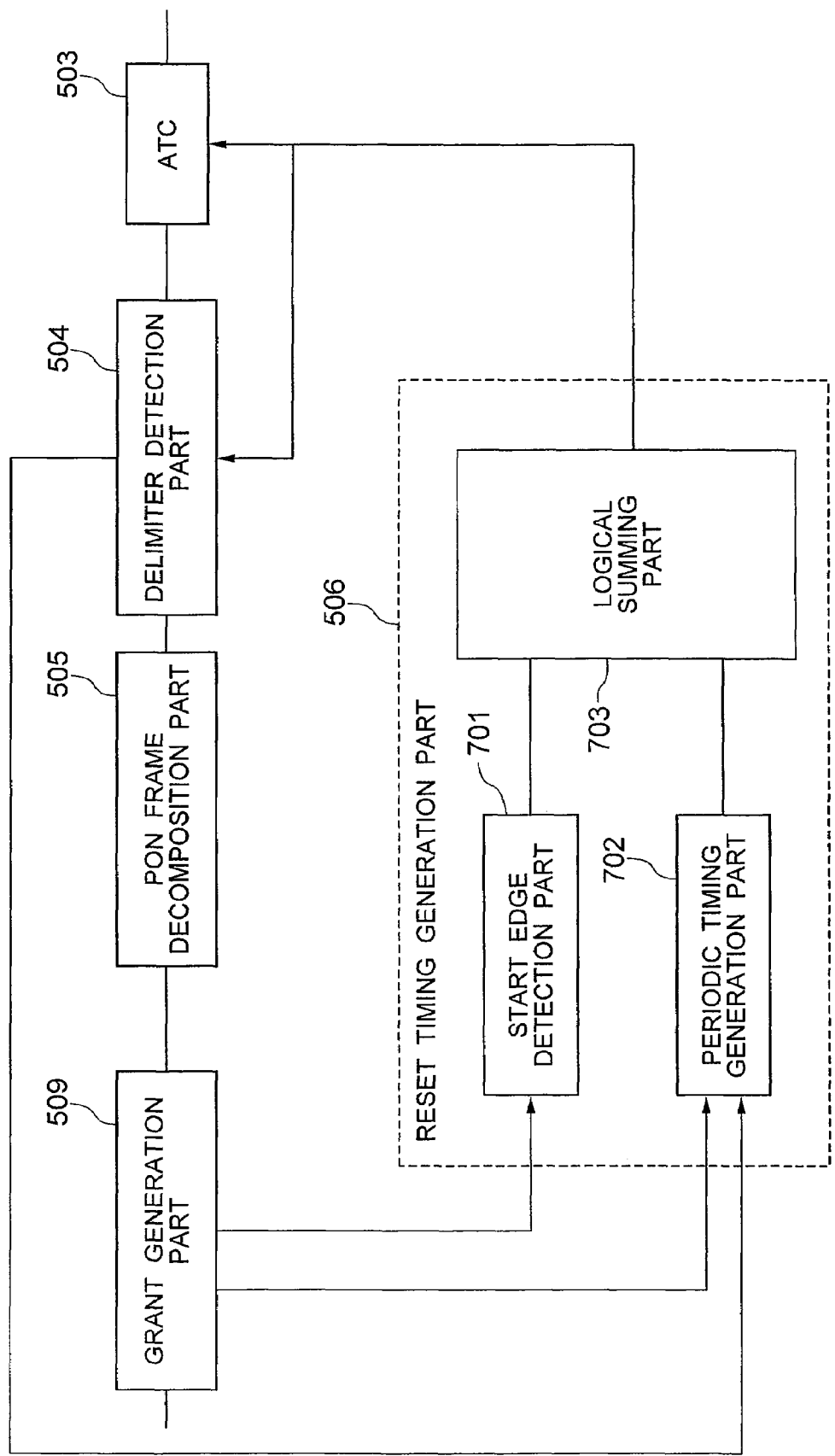
FIG. 7 is a diagram showing an embodiment of a functional block supplying an ATC reset.

In FIG. 7, there is shown a block diagram of a reset timing generation part 506 supplying a reset signal to ATC 503. A start edge detector 701 receives a "Start" value/"End" value form grant generation part 509 and when it is time to start reception of optical signals from the ONU, a start edge signal is generated. The present signal is used for delimiter detection validation in a normal operating state after the ONU has been activated and ATC reset.

On the other hand, the start and end timing of the ranging window, which is output by grant generation part 509, is notified to a periodic timing generation part 702, or during the interval of the ranging window, by making the signal be put in the ON state, or the like, a ranging window signal indicating the interval of the ranging window is input. Further, there is also input, into periodic timing generation part 702, a delimiter detection notification signal indicating that a delimiter which is output by delimiter detection part 504 and included in the signal from the ONU has been detected. Periodic timing generation part 702 generates a delimiter detection validation signal which validates the processing of delimiter detection part 504 and hastens the carrying out of new delimiter detection processing and an ATC reset signal for resetting ATC 503, if a timing detection notification signal is input while it is being indicated by means of a ranging window signal that there is currently a ranging window interval.

The fact of validating delimiter detection part 504 together with the resetting of ATC 503 means there is a possibility, if delimiter detection is carried out continuously, of erroneously recognizing as the delimiter a signal inside the payload, being random data, in a distance measurement signal. In order to prevent an erroneous recognition such as this, once delimiter detection part 504 detects a delimiter, the following delimiter detection operation is temporarily halted. When delimiter detection part 504 receives a delimiter detection validation signal, delimiter detection starts for the second time. In this way, even if there is currently a ranging window interval, by resetting ATC 503 whenever a delimiter signal from a different ONU is detected, it becomes possible to receive and process "ranging request" signals from a plurality of ONUs even within one ranging window. Further, after the ATC reset, reception of the following distance measurement signal becomes precisely possible. Since the distance measurement signal has as far as possible a length of several tens of seconds, the probability that a distance measurement signal from a different distance collides is small and several ONU distance measurements can be carried out within one ranging window.

Logical summing part 703 merges and outputs the delimiter detection validation and ATC reset signal in the aforementioned normal operating state coming from start edge detector 701, the aforementioned delimiter detection validation signal within the aforementioned ranging window and the ATC reset signal coming from periodic timing generation part 702, and validates delimiter detection part 504 together with resetting ATC 503.

Figure 8:
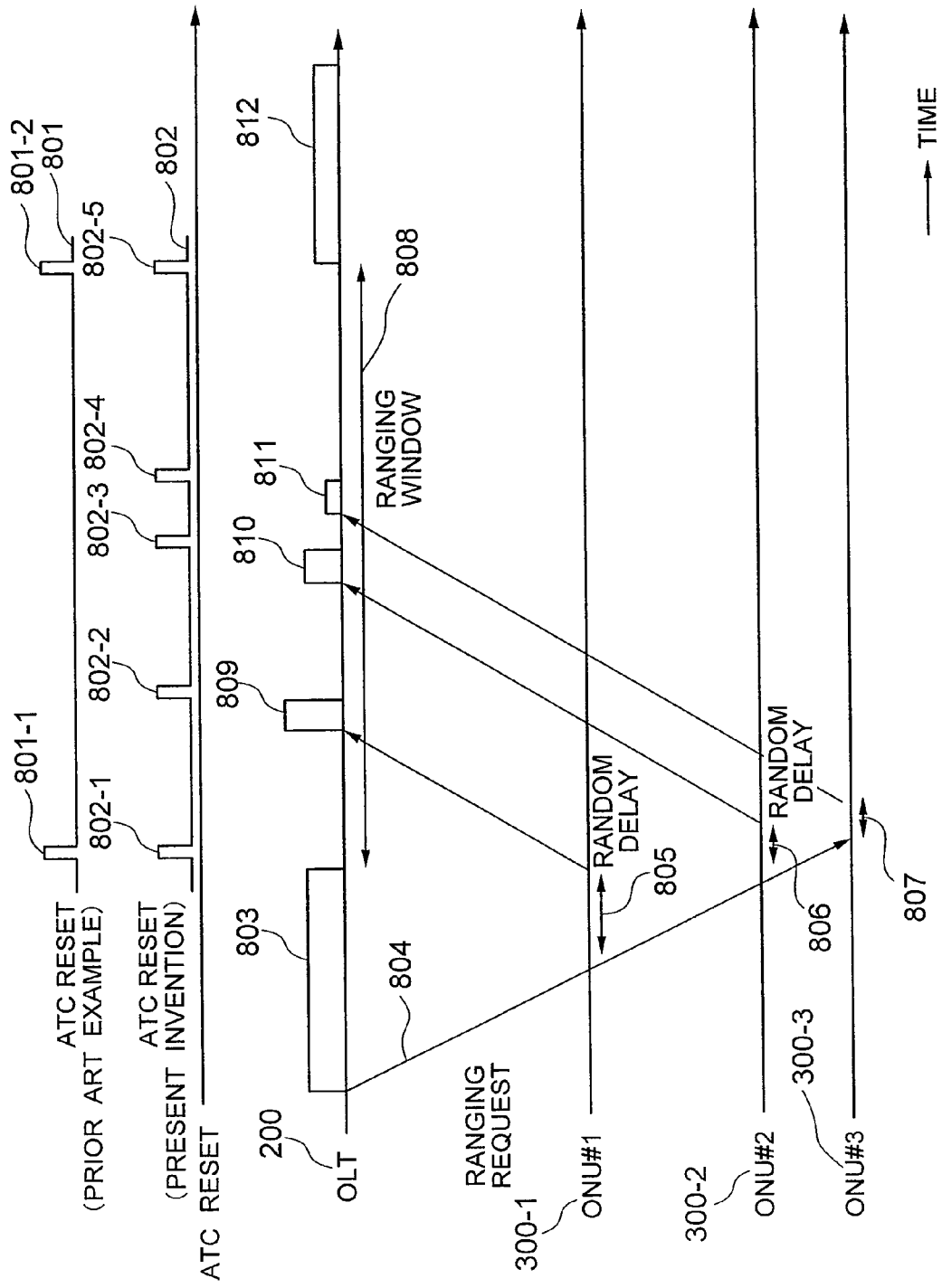
FIG. 8 is a diagram showing a time chart of the first embodiment.

In FIG. 8, a time chart of the ranging processing of the present embodiment is shown. A signal generated by periodic timing generation part 702 explained in FIG. 7 is indicated as ATC reset 802. OLT 200 transmits toward ONU 300-1, ONU 300-2, and ONU 300-3 distance measurement requests ("ranging requests") 804, ONU 300-1, ONU 300-2, and ONU 300-3 respectively independently generating random delays 805, 806, and 807 and transmitting distance measurement signals ("ranging responses"). In case ONUs with nearly equal distances are present within one PON interval, by giving random delays defined in Ch. 10 of Recommendation G.984.3 and making send distance measurement signals, the arrival times at the OLT are randomized, so the collision of distance measurement signals are stochastically avoided, making it possible to bring to success a plurality of ONU distance measurements within one ranging window.

OLT 200 carries out ATC reset 802-1 at the start position of a ranging window 808 by means of periodic timing generation part 702 and resets the threshold value of a preceding burst signal 803. Next, OLT 200 receives a first distance measurement signal 809, immediately thereafter carries out an ATC reset 802-2, and resets the threshold value of first distance measurement signal 809. Further, OLT 200 receives a second distance measurement signal 810, immediately thereafter carries out an ATC reset 802-3, and resets the threshold value of second distance measurement signal 810. Next, OLT 200 receives a third distance measurement signal 811, immediately thereafter carries out an ATC reset 802-4, and resets the threshold value of third distance measurement signal 811.

In this way, by receiving a distance measurement signal and immediately thereafter carrying out an ATC reset and the validation of a delimiter detection circuit, it is possible to bring a plurality of distance measurements to success within one ranging window.

Second Embodiment

As another embodiment, there may be considered one in which periodic timing generation part 702 periodically generates and outputs, during the ranging window interval, ATC resets and delimiter detection validation signals. Even in this case, it is possible for periodic timing generation part 702, by means of a ranging window signal received from grant generation part 509, to output the aforementioned reset signals and the like periodically just during the ranging window interval.

Figure 9:
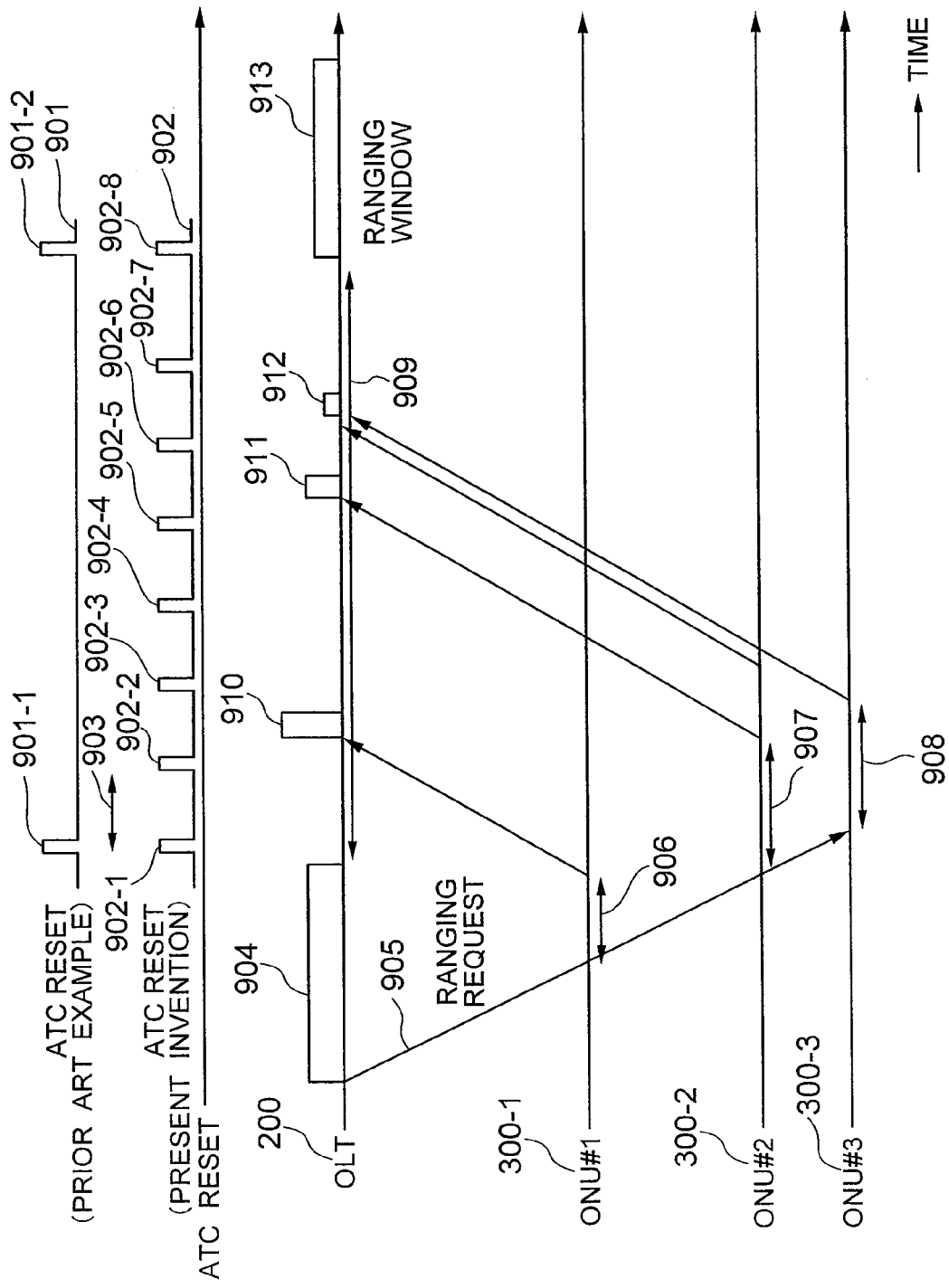
FIG. 9 is a diagram showing a time chart of the second embodiment.

In FIG. 9, the time chart of the present embodiment is shown. The signals generated by periodic timing generation part 702 are indicated as ATC resets 902. OLT 200 transmits distance measurement requests (ranging requests) 905 toward ONU 300-1, ONU 300-2, and ONU 300-3, and ONU 300-1, ONU 300-2, and ONU 300-3 respectively transmit distance measurement signals (ranging responses). Specifically, ONU 300-1 transmits a distance measurement signal 910, ONU 300-2 transmits a distance measurement signal 911, and ONU 300-3 transmits a distance measurement signal 912.

OLT 200 carries out an ATC reset 902-1 at the start position of the ranging window and resets the threshold value of a preceding burst signal 904. Next, OLT 200 periodically carries out ATC resets 902-2, 902-3, 902-4, 902-5, 902-6, and 902-7 at equal intervals 903. Similarly to the example shown in FIG. 9, if distance measurement signals from each ONU can be received in the ATC reset interval, ranging processing with respect to a plurality of ONUs within one ranging window becomes possible.

Third Embodiment

In the method of the second embodiment, there is the possibility that an ATC reset and a distance measurement signal from an ONU collide, so at this point, the ranging processing with respect to the ONU would fail. As yet another embodiment, there may be considered a method devised so that each ONU having received a ranging request from OLT 200 replies with a plurality of ranging requests, leaving intervals in between.

Figure 10:
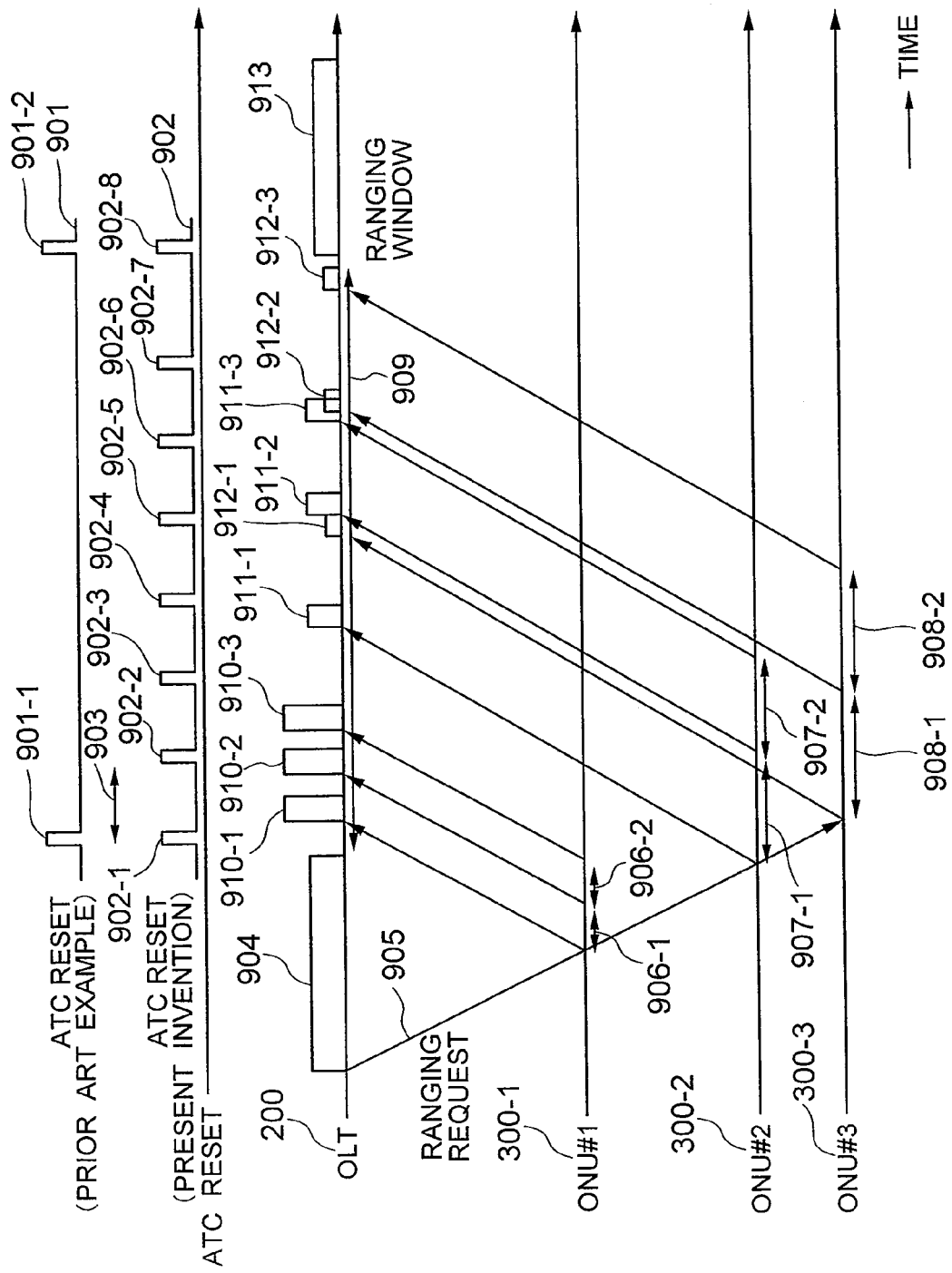
FIG. 10 is a diagram showing a time chart of the third embodiment.

In FIG. 10, the time chart of the present embodiment is shown. Regarding portions which are the same, as in the time chart of FIG. 9, the same reference numerals are attached. A signal generated by periodic timing generation part 702 is shown as ATC reset 902. OLT 200 transmits distance measurement requests (ranging requests) 905 toward ONU 300-1, ONU 300-2, and ONU 300-3. ONU 300-1, ONU 300-2, and ONU 300-3 respectively transmit a plurality of distance measurement signals (ranging responses). Specifically, ONU 300-1 transmits a distance measurement signal 910-2 leaving an interval 906-1, after having transmitted distance measurement signal 910-1, and further transmits a distance measurement signal 910-3 after an interval 906-2. In the same way, ONU 300-2 transmits a distance measurement signal 911-1 and, after leaving an interval 907-1, transmits distance measurement signal 911-2 and, further, after interval 907-2, transmits distance measurement signal 911-3. ONU 300-3 also transmits distance measurement signals 912-1, 912-2, and 912-3 with intervals 908-1 and 908-2 sandwiched in between.

From among the distance measurement signals 910-1, 910-2, and 910-3 transmitted from ONU 300-1, distance measurement signal 910-1 is normally received after ATC reset 902-1. Distance measurement signal 910-2 collides with ATC reset 902-2, so reception fails. Distance measurement signal 910-3, since distance measurement signal 902-2 and ATC reset 910-2 have collided, has a reset which is insufficient, but since the immediately preceding signal has been transmitted from the same ONU 300-1 and is a signal with the same amplitude, there is a possibility that it is received normally, even if the threshold value is insufficient. In this way, from among the three times the distance measurement signal was sent, it is received normally at least once.

In the same way, from among the distance measurement signals 911-1, 911-2, and 911-3 transmitted from ONU 300-2, distance measurement signal 911-1 is received normally after ATC reset 902-3, but distance measurement signal 911-3 collides with distance measurement signal 912-2 from another ONU 300-3 and reception fails. Even here, from among the three times the distance measurement signal is sent, it is received normally at least once. Further, from among the distance measurement signals 912-1, 912-2, and 912-3 transmitted from ONU 300-3, distance measurement signal 912-1 collides with ATC reset 902-5 and reception fails and as for distance measurement signal 912-2, it collides with distance measurement signal 911-3 from another ONU 300-2, so reception fails, but distance measurement signal 912-3 is received normally after ATC reset 902-7. Either way, from among the three times the distance measurement signal was sent, the signal is received normally at least once.

By having the respective ONUs transmit a plurality of distance measurement signals, it is avoided, although the total number of distance measurement signals rises and the probability increases that there will somewhere occur a collision, that the same ONUs are combined and collisions occur repeatedly, by changing the number of intervals of the plurality of distance measurement signals transmitted by the respective ONUs, so there is a high probability that at least once the distance measurement will succeed. In other words, taking interval 906 between transmissions of distance measurement signals by ONU 300-1, interval 907 of ONU 300-2, and interval 908 of ONU 300-3 to be different, and further, even if ONU 300-1 is the same, it is possible to reduce the probability of collision by taking intervals 906-1 and 906-2 to be different.

The intervals with which ONU 300-1 transmits distance measurement signals may be set autonomously by the ONU by using a serial number or an ONU-ID indicated from the OLT, or the OLT may indicate a distance measurement signal interval with respect to the ONU. Alternatively, it is also possible to use dynamically changing random values as intervals of the plurality of distance measurement signals and in this case also, the ONU may be provided with a random counter and autonomously set the intervals, or the OLT may be provided with the random counter and indicate the intervals of the distance measurement signals with respect to the ONUs.

Fourth Embodiment

In the methods of the aforementioned second and third embodiments, in case ONUs with nearly equal distances are present in one PON interval, it is possible, by conferring random delays defined in e.g. Ch. 10 of Recommendation G.984.3 and making transmit distance measurement signals, to randomize arrival times to the OLT and to stochastically avoid collision of distance measurement signals and so to bring to success a plurality of ONU distance measurements within one ranging window. However, since collision prevention based on random delays is a stochastic avoidance measure, it is good in the case of a small number of ONUs, but in case several hundred multiple ONUs are simultaneously carrying out distance measurements, there is a possibility that there will somewhere occur a collision when attempting distance measurements. An explanation will be given of an embodiment which, in order to avoid this situation, restricts the number of ONUs returning distance measurement signals by means of SN mask generation part 508 in the post stage of delimiter detection part 507 shown in FIG. 5.

In ITU-T Recommendation G.983.1, there are defined a method wherein the OLT carries out a distance measurement after indicating one eight byte long serial number being an individual ONU identification number; and a method wherein the OLT, without indicating a serial number, after having requested a signal for distance measurement, and when detecting a collision of signals from a plurality of ONUs, requests a signal for distance measurement for a second time while indicating a part of the serial number, and gradually makes adjustments so that only one signal for distance measurement is transmitted. Also, in a GPON, there is in addition to these methods defined a mechanism called random delay wherein the ONU adds a random time delay and transmits a signal for distance measurement; and a method wherein first an ONU serial number is obtained from the signal for distance measurement received at first with random delay, and subsequently, using the obtained serial number, a distance measurement is carried out after indicating one ONU. In the present embodiment as well, there is proposed a method in which, using the serial number given to each ONU, the number of ONUs replying to a ranging request message from the OLT is restricted.

Figure 5:
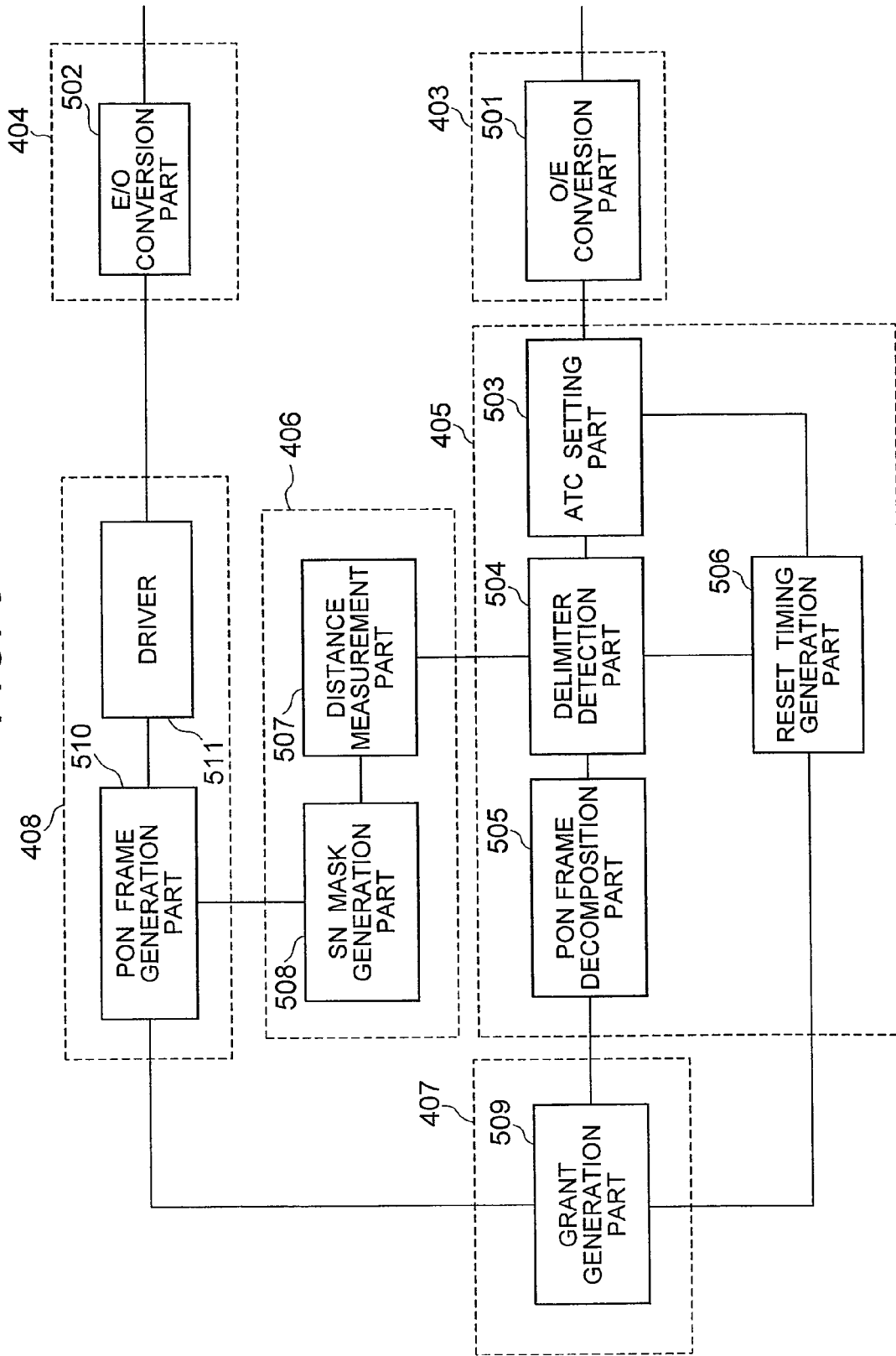
FIG. 5 is a diagram showing an embodiment a functional block related to ranging processing.

In the present embodiment, if the need arises because distance measurement signal collisions occur frequently or the like, the SN mask generation part 508 shown in FIG. 5 restricts the serial numbers of ONUs returning a distance measurement signal. Further, as for the condition of activating SN mask generation part 508, it may be devised so that the control part controlling the operation of OLT 200 as a whole detects frequent occurrences of collisions and notifies SN mask generation part 508 of the activation, or it may be devised so that distance measurement part 507 counts the number of distance measurement failures and requests an activation when the counted number of failures exceeds a predetermined value. Alternatively, the condition may be devised so that SN mask generation part 508 itself counts the number of distance measurement failures and judges whether an activation is necessary or not by comparing the number against a predetermined value.

Figure 11:
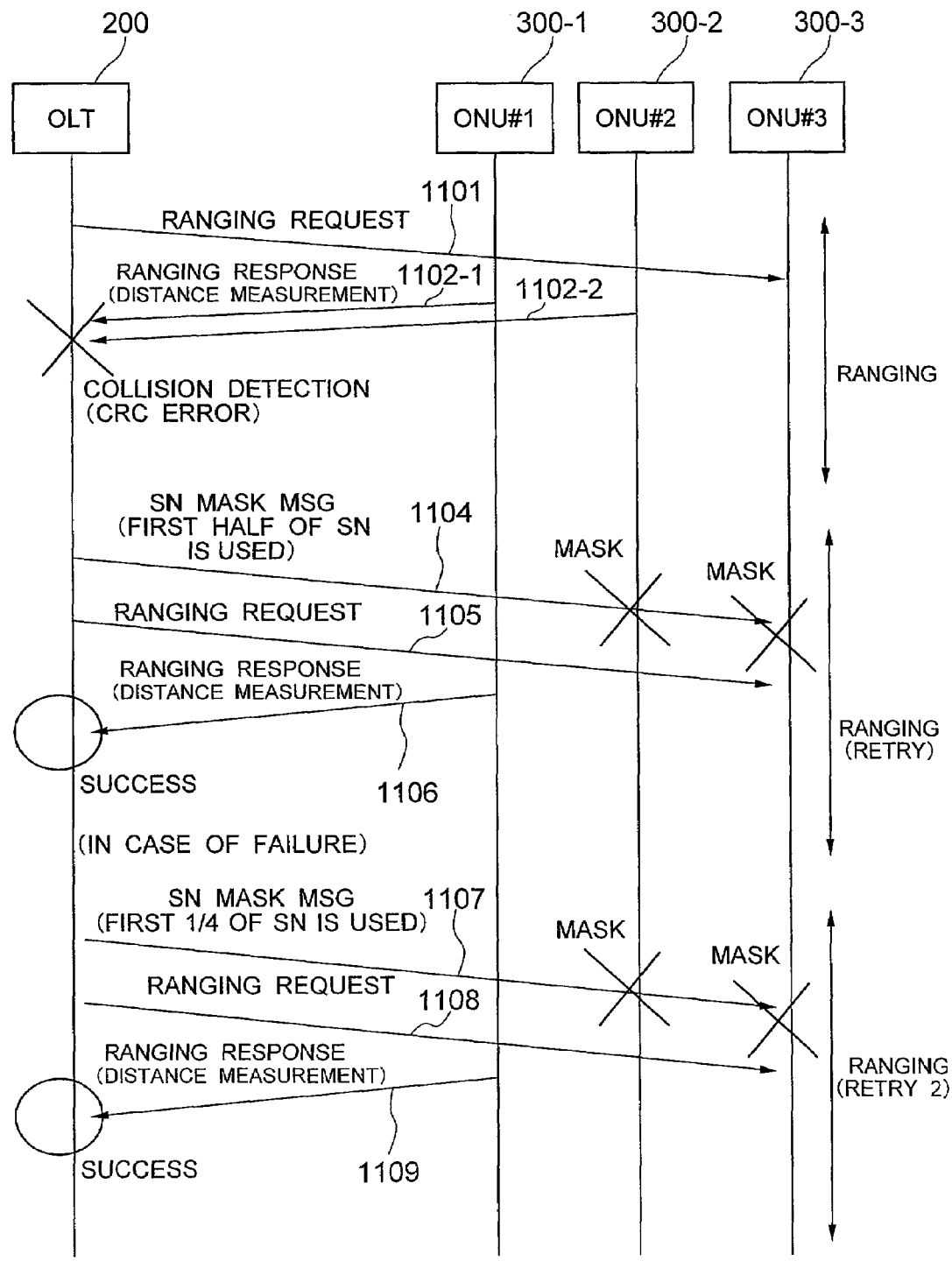
FIG. 11 is a diagram showing a time chart of the fourth embodiment.

In FIG. 11, the time chart in the present embodiment is shown. OLT 200 transmits a distance measurement request (ranging request) 1101 toward ONU 300-1, ONU 300-2, and ONU 300-3. If ONU 300-1 and ONU 300-2 respectively transmit distance measurement signals (ranging responses) 1102-1 and 1102-2, collisions occur, and a distance measurement failure is detected by means of a CRC error of the received signal in OLT 200. In the prior art, all the information on a distance measurement signal received in the case where an OLT had failed in a distance measurement was discarded, but in the present embodiment, at least the information including the serial number of the ONU is accumulated temporarily, from among the received distance measurement signals. The place of storing the serial number may be memory space of OLT 200, or generation part 508 may be devised to hold the serial numbers.

Next, SN mask generation part 508 of OLT 200 extracts the first half of the serial number from the aforementioned accumulated distance measurement signals and outputs it to PON frame generation part 510. PON frame generation part 510 creates a serial number mask message 1104, described in Ch. 9 of ITU-T Recommendation G.984.3, so as to match the concerned extracted value and transmits it toward the ONU. Serial number mask message 1104 is used to make only those ONUs react whose eight-byte serial numbers with a part masked coincide. Even if it is assumed that distance measurement signals from a plurality of ONUs collide and the distance measurement fails, there is a high probability that it has been possible to correctly receive part of the serial numbers. Consequently, if the ONUs are narrowed down to those whose serial numbers match in part and a ranging request 1105 is transmitted, the reactions of e.g. ONU 300-2 and ONU 300-3 are masked, so the probability that distance measurement signal 1106 of only ONU 300-1 can be received becomes higher.

If distance measurement fails here as well, if OLT 200 transmits a ranging request 1108 after serial number mask generation part 508 has extracted the value of the first quarter of the serial number in a serial number mask message 1107 and narrowed down the ONUs, the reactions of ONU 300-2 and ONU 300-3 are masked, so the probability of being able to receive distance measurement signal 1109 of ONU 300-1 only is further increased. In this example, the first half or the first quarter of the serial number is extracted and a narrowing down of the ONUs is implemented, but it is acceptable for SN mask generation part 508 to use an arbitrary position of the serial number to conduct the narrowing down.

In the aforementioned embodiment, an explanation was given in accordance with a GPON compliant with ITU-T Recommendation G.984.3, but it can also be applied to other PON systems, e.g. an Ethernet™PON system defined in Ch. 64 of the IEEE 802.3 Standard.

In this way, even if it is not possible, in the present embodiment, to obtain the entire eight byte length of a serial number due to a collision, there is used a serial number mask message, defined in Recommendation G.984.3, in which the first half (four bytes) of an eight-byte serial number is input, the ranging candidate ONUs are limited, and a distance measurement is carried out for a second time. Even in the case where a collision of a plurality of distance measurement signals is generated, the probability that a part of the first half of distance measurement signal can be received normally is high if a random delay function is used in combination, it is possible, by limiting the ONUs by means of the serial number mask message, to bring a distance measurement from the limited ONUs to success with a high probability. Even in this processing, it is still possible, in case there occurs a collision of distance measurement signals, to further only use the first quarter (two bytes) of the serial number, use a serial number mask message, and attempt a distance measurement for a second time. As for the serial number limitation methods, a number of them can be considered, such as the method of reducing by one bit at a time, the method of progressively increasing the number of bits to be reduced from 1 to 2, 4, etc., and the method of using a random length for each distance measurement, but the method of gradually decreasing the length of the used serial number from 1 to ½, ¼, ⅛, etc., has the best balance between comprehensiveness and efficiency.

Further, the present embodiment is not limited to the second and third embodiments, since it may be used in combination with the first embodiment.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A passive optical network system comprising:
a station-side communication device;
a plurality of subscriber-side communication devices;
an optical splitter and a plurality of optical fibers connecting the plurality of subscriber-side communication devices to the station-side communication device,
wherein the station-side communication device determines timing of transmitting a signal to the station-side communication device from the subscriber-side communication devices for communications between the station-side communication device and the subscriber-side communication devices,
the station-side communication device comprising:
a threshold control part detecting a voltage level of a received signal converted into an electrical signal from an optical signal transmitted from one of the plurality of subscriber-side communication devices;
a signal detection part detecting breaks in the received signal;
a transmission granting part determining the timing at which transmission of optical signal from each of the subscriber-side communication devices is granted; and
a reset timing generation part generating a reset signal for resetting the voltage level detected by the threshold control part when it is notified from the signal detection part that there has been detected a break in the received signal, wherein:
a distance measurement request signal for measuring distances between said respective plural subscriber-side communication devices and the station-side communication device is transmitted to the plurality of subscriber-side communication devices, and response signals from the plurality of subscriber-side communication devices in response to the distance measurement request signal are received to calculate transmission delay times of optical signals from the subscriber-side communication devices; and
while the transmission granting part is notifying the subscriber-side communication devices that distance measurement is carried out, when the signal detection part detects a break in a received response signal from one of the subscriber-side communication devices, the reset timing generation part sends a reset signal to the threshold control part, and then the threshold control part executes reception of a response signal from another subscriber-side communication device.

2. The passive optical network system according to claim 1, wherein in each of the plurality of subscriber-side communication devices, when the distance measurement request signal is received from the station-side communication device, the response signal is delayed at random and the delayed response signal is transmitted to the station-side communication device.

3. A passive optical network system comprising:
a station-side communication device;
a plurality of subscriber-side communication devices;
an optical splitter and a plurality of optical fibers connecting the plurality of subscriber-side communication devices to the station-side communication device, wherein:
the station-side communication device determines timing of transmitting a signal to the station-side communication device from the subscriber-side communication devices for communications between the station-side communication device and the subscriber-side communication devices,
the station-side communication device comprises:
a threshold control part detecting a voltage level of a received signal converted into an electrical signal from an optical signal transmitted from one of the plurality of subscriber-side communication devices, holding a threshold value corresponding to the detected voltage level, and identifying the received signal by using the threshold value to output the identified received signal;

a signal detection part detecting breaks in the received signal output from the threshold control part;

a transmission granting part determining the timing at which transmission of optical signal from each of the subscriber-side communication devices is granted; and a reset timing generation part generating a reset signal for instructing the threshold control part to reset the threshold value when it is notified from the signal detection part that there has been detected a break in the received signal;

a distance measurement request signal for measuring distances between said respective plural subscriber-side communication devices and the station-side communication device is transmitted to the plurality of subscriber-side communication devices, and response signals from the plurality of subscriber-side communication devices in response to the distance measurement request signal are received to calculate transmission delay times of optical signals from the subscriber-side communication devices; and while the transmission granting part is notifying the subscriber-side communication devices that distance measurement is carried out, when the signal detection part detects a break in a received response signal from one of the subscriber-side communication devices, the reset timing generation part sends a reset signal to the threshold control part, and then the threshold control part executes reception of a response signal from another subscriber-side communication device.

4. The passive optical network system according to claim 3, wherein in each of the plurality of subscriber-side communication devices, when the distance measurement request signal is received from the station-side communication device, the response signal is delayed at random and the delayed response signal is transmitted to the station-side communication device.

5. A ranging method of measuring distances between a station-side communication device and subscriber-side communication devices in an optical network system comprising the station-side communication device and a plurality of subscriber-side communication devices connected via an optical splitter and a plurality of optical fibers, the method comprising the steps of:

notifying each of the subscriber-side communication devices that a distance between the station-side communication device and any one of the subscriber-side communication devices is being measured;

transmitting a distance measurement request signal for measuring distances to each of the plurality of subscriber-side communication devices;

receiving response signals transmitted from the subscriber-side communication devices in response to the distance measurement request signal; and calculating a signal transmission delay time between the station-side communication device and each of the subscriber-side communication devices, wherein:

in the step of receiving response signals, when a break in a response signal transmitted from a first subscriber-side communication device is detected, a receiving circuit in the station-side communication device receiving a response signal from any one of the subscriber-side communication devices is reset to execute a reception of a response signal from a second subscriber-side communication device in the receiving circuit; and in the step of calculating the signal transmission delay time, the delay time is calculated in a time period when the distance between the station-side communication device and each of the subscriber-side communication devices is measured.

6. The ranging method according to claim 5, wherein in the step of receiving response signals, when the break in the response signal transmitted from the first subscriber-side communication device is detected, a voltage level of the receiving circuit is reset, and the receiving circuit starts to receive the response signal from the second subscriber-side communication device, the receiving circuit receiving a signal based on the voltage level detected from an electrical signal converted from an optical signal transmitted from one of the plurality of subscriber-side communication devices.

7. The ranging method according to claim 5, wherein in each of the plurality of subscriber-side communication devices, when the distance measurement request signal is received from the station-side communication device, the response signal is delayed at random and the delayed response signal is transmitted to the station-side communication device.

* * * * *